United States Patent [19]

Murata et al.

[11] Patent Number: 4,958,153

[45] Date of Patent: Sep. 18, 1990

[54] METHOD AND APPARATUS FOR PRIORITY CONTROL OF INCOMING CALLS AT ISDN TERMINALS

[75] Inventors: Hatsuho Murata; Hiroshi Ikeda, both of Tokyo, Japan

[73] Assignee: NEC Corporation, Tokyo, Japan

[21] Appl. No.: 178,131

[22] Filed: Apr. 6, 1988

[30] Foreign Application Priority Data

Apr. 8, 1987 [JP] Japan .................................. 62-84877

[51] Int. Cl.$^5$ .............................................. H04Q 1/00
[52] U.S. Cl. ................................ 340/825.5; 370/94.1; 370/85.6
[58] Field of Search ........................ 340/825.5, 825.51; 370/58, 60, 85, 94, 95, 110.1, 58.1, 85.6, 94.1, 95.1

[56] References Cited

U.S. PATENT DOCUMENTS

| | | | |
|---|---|---|---|
| 4,063,220 | 12/1977 | Metcalfe et al. | 340/825.5 |
| 4,332,027 | 5/1982 | Malcom et al. | 370/94.1 |
| 4,536,874 | 8/1985 | Stoffel et al. | 340/825.5 |
| 4,553,235 | 11/1985 | Svensson | 370/94 |
| 4,630,261 | 12/1986 | Irvin | 370/81 |
| 4,663,748 | 5/1987 | Karbowiak et al. | 340/825.5 |
| 4,722,082 | 1/1988 | Furuya et al. | 340/825.5 |
| 4,764,920 | 8/1988 | Furuya et al. | 340/825.51 |

OTHER PUBLICATIONS

Integrated Service Digital Network (ISDN) Interface Layer 3 Specification-Jul. 2, 1986.

*Primary Examiner*—Donald J. Yusko
*Assistant Examiner*—Edwin C. Holloway, III
*Attorney, Agent, or Firm*—Helfgott & Karas

[57] ABSTRACT

The invention relates to method and apparatus by which the order in which ISDN terminals answer incoming calls can be easily established and changed by the ISDN user. The order is established by assigning a waiting time to each terminal, this waiting time being determined, e.g., by the subscriber number of an incoming caller or the type of call. A terminal only signals its eligibility to accept an incoming call after the waiting time has elapsed and its compatibility with the call has been established.

4 Claims, 5 Drawing Sheets

METHOD AND APPARATUS FOR PRIORITY CONTROL OF INCOMING CALLS AT ISDN TERMINALS

CROSS-REFERENCE TO RELATED APPLICATION

This application is related to the following filed application: H. Murata and H. Hirata, Ser. No. 043,462, entitled "Response System of a Terminal to an Incoming Call".

BACKGROUND OF THE INVENTION

The present invention relates to a communication terminal connected to a communication network and, more particularly, to a system for a communication terminal having an interface which conforms to The Comité Consultatif International Télégraphique et Téléphonique (CCITT) Recommendations, I. series, to respond to an incoming call.

The CCITT named a network for offering a digital communication service Integrated Service Digital Network (ISDN) and, in 1984, gave Recommendations, I. series (Redbook) on basic ISDN items. In accordance with the Recommendation I. 451 (CCITT Redbook Vol. III, Fascicle III.5/Q.931), on receipt of a call accept (SETUP) message from a network, a terminal compares the values of its own attributes with those of the service attributes of the call which are contained in the SETUP message so as to decide whether or not to respond to the call and, only when it has decided to respond, sends a respond message CONNect (CONN) to the network.

A more specific procedure is as follows.

A message sent from a network to a terminal for connection is called a SETUP message. The SETUP includes various kinds of information elements such as protocol disciminator, call reference, message type, bearer capability, channel identification, progress indicator, terminal capabilities, display, keypad, signal, switchhook, calling party number, calling party subaddress, called party number, called party subaddress, transit network selection, low layer compatibility, high layer compatibility, user-user information (CCITT I.451/Q931). Among such information elements, the bearer capability, low layer compatibility, high layer compatibility and user-user information are used for compatibility checking which the terminal performs for deciding whether it may answer a call that has arrived. These information elements other than the bearer capability are ommited, as the case may be. The terminal has therein a classified table of those contents of the above-stated information elements with which it is compatible, and their items, i.e., attributes as well as their values. The terminal decides whether it may accept an incoming call by comparing the contents of a call message that has arrived with those stored therein.

Referring to FIG. 1, assume that a customer premises 20 which is incorporated in an ISDN network 10 includes a point-multipoint bus 22 which is connected to the network 10 via a network termination (NT) 21, that a plurality of terminal equipment (TE's) 23, 24, . . . , and 2n are present on the bus 22, and that the TE's 23, 24, . . . , and 2n share a single subscriber number and have no subaddress.

As shown in FIG. 2, in the case of a prior art response system as prescribed by the Recommendation I.451, when a SETUP message is broadcast from the network 10 to the TE's 23, 24, . . . , and 2n. If a plurality of TE's, e.g. TE's 23 and 25 decide that they are ready to respond to the call, each of the TE's 23 and 25 returns a CONN message to the network 10. Then, the network 10 sends a CONNect ACKnowledge (CONN ACK) message to that TE 23 which returned the CONN message first, thereby allowing the TE 23 to answer the call but not the TE 25.

Since the ISDN terminal arrangement described above is so designed that, if a plurality of such terminals are connected to the same point-multipoint bus, the call be accepted by the terminal which has returned a CONN message first, the choice of the terminal may not be consistent with the order of priority desired by the ISDN user for the responses of the ISDN terminals to incoming calls.

Meanwhile, there are also proposed a method by which a switching system differentiates the ISDN terminals and sequentially designates a subaddress for each ISDN terminal according to the order of responding priority to properly connect the incoming call, and another by which a special network termination (NT) 21 is installed in the premises and given the same function as the switching system mentioned above, but they still have the disadvantage that the ISDN terminals on the subscriber side cannot set the priority order freely and simply on their own.

This leads to the problem that, if there is one among the communication terminals which is always quicker than the others to return a CONN message, every incoming call will be accepted by this communication terminal, but connection can be made to no other terminal, even if communication is desired with another terminal and call initiation is attempted many times.

In this connection, a response system of a terminal to an incoming call has been proposed in the U.S. Patent Application Ser. No. 043,462 assigned to the same assignee as the present application. This system is provided with a plurality of communication terminals sharing a single subscriber number, to enable each of the communication terminals to complete the line connection for the incoming message with means to store the calling party's number and attributes of the incoming call if the terminal finds itself different from the really desired party and another means to delay the timing of returing a CONN message in response to every subsequent incoming call having the same calling party number and attributes.

The above-mentioned method for priority order control for responses of an ISDN terminal to incoming calls has another disadvantage that, if the ISDN terminal is composite and has a plurality of communication service functions and the constituent unit in ISDN terminals differ from one another in functional capacity, only one priority order is available for the composite terminal even if one priority order is desired for one communication service function (for instance fascimile) and another for another function (for example packet communication).

SUMMARY OF THE INVENTION

An object of the present invention is to provide a method for priority order control of incoming calls at ISDN terminals to enable the priority order for each type of call to be followed in actually accepting incoming calls by setting a separate priority order for each of the ISDN terminals in the subscriber's premises and for each type of call, so that, even if a wide variety of composite ISDN terminals share a single in-premise bus, these terminals can be efficiently used.

According to the invention, there is provided a method for priority order control of incoming calls at ISDN terminals for use wherein call acceptance (SETUP) messages are supplied to the system via a network termination from the network, each SETUP message including calling and called party numbers and associated values, and said system including a plurality of terminals, each terminal having the same subscriber number with the same associated attribute values and no subaddress, said method comprising the steps of:

(a) a first step to start counting the timing when said SETUP message has been received;

(b) a second step to check whether at least either the subscriber number of the calling party or one of the associated values included in the inputted incoming message call is registered in the memory of this terminal;

(c) a third step to output, if these information elements are registered, a waiting time setting signal corresponding to at least either the subscriber number of said calling party or one of the associated values;

(d) a fourth step to compare the count of said timing and the value of said waiting time setting signal, and output a count-up signal when said count has become equal to or greater than said waiting time setting signal; and (e) a fifth step to output a response (CONN) message in response to this count-up signal and a signal indicating the possibility for this incoming call to be accepted by said terminal.

BRIEF DESCRIPTION OF THE DRAWINGS

The present invention will be described in detail below in conjunction with the accompanying drawings, in which.

In the drawings, the same reference numerals denote the same or corresponding structural elements.

DESCRIPTION OF THE PREFERRED EMBODIMENT

Figure 1:
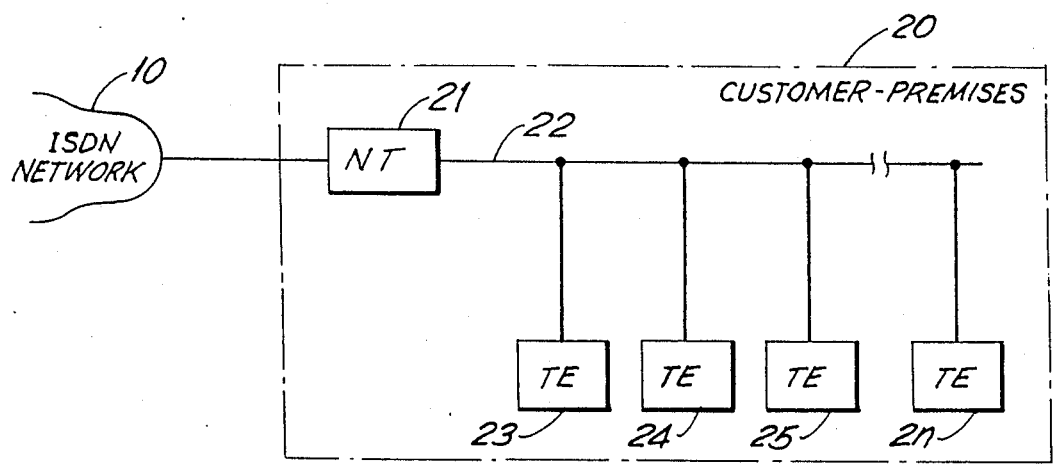
FIG. 1 illustrates an example of system structure to which the invention is applicable.
Figure 2:
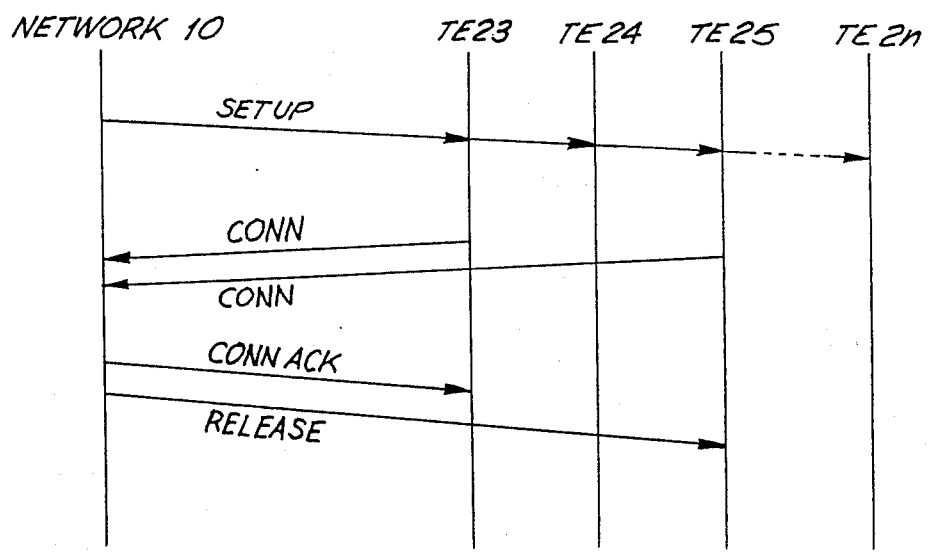
FIG. 2 is a sequential diagram illustrating an example of message exchange between a communication network and terminals.
Figure 3:
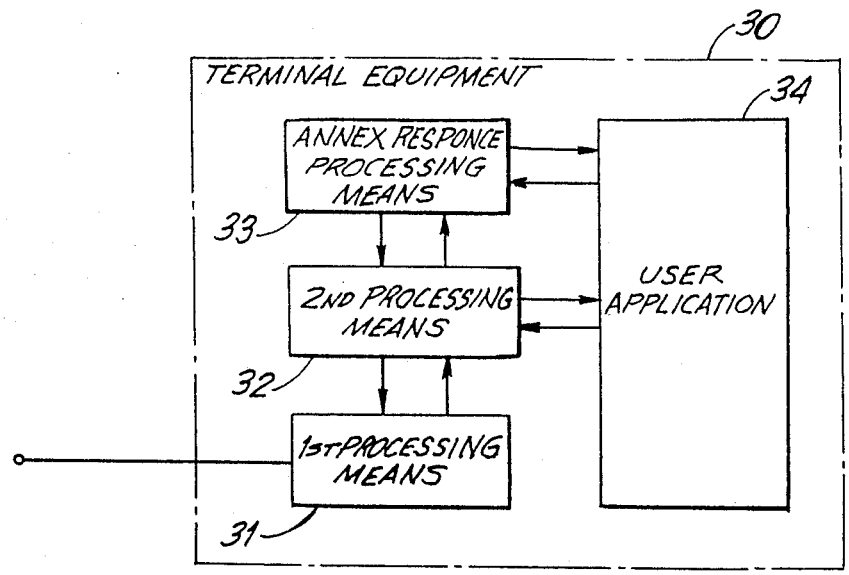
FIG. 3 is a block diagram illustrating a preferred embodiment of the invention.
Figure 5:
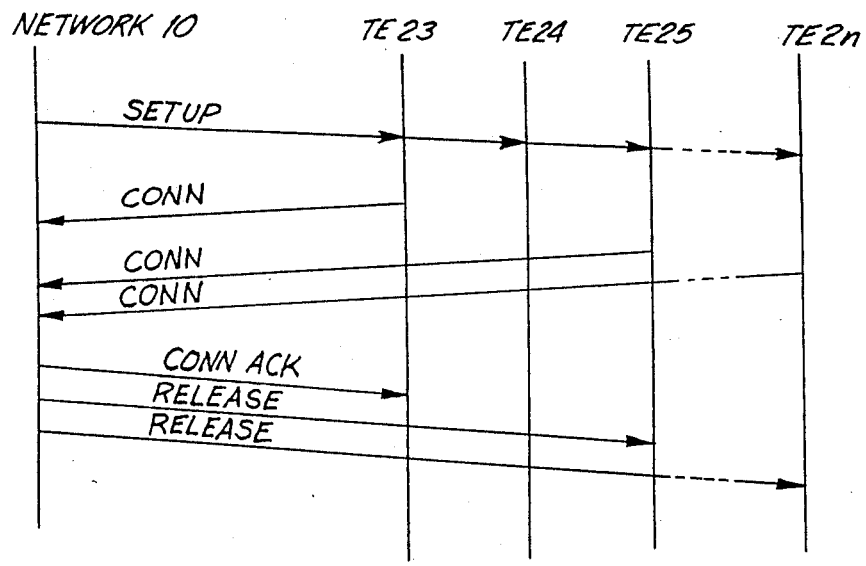
FIG. 5 is a sequential diagram illustrating an example of message exchange between a communication network and terminals in the embodiment of the invention.

Referring to FIG. 3, a terminal equipment (TE) 30 to which the present invention is applied generally comprises first processing means 31 which is made up of a Layer 1 controller for matching an interface adapted for physical connection and for performing electrical control for bit transmission, and a layer 2 controller for deciding whether a link is normally usable through, for example, error detection and parity check; second processing means 32 to which are assigned Layer 3 processing such as state display information processing associated with call origination, response, disconnection and others, and selection control information processing associated with dial enabling, process display, dial number, communication class and others; annex response processing means 33 details of which will be described later, and user application means 34 which includes a user application and an operation/maintenance application.

Figure 4:
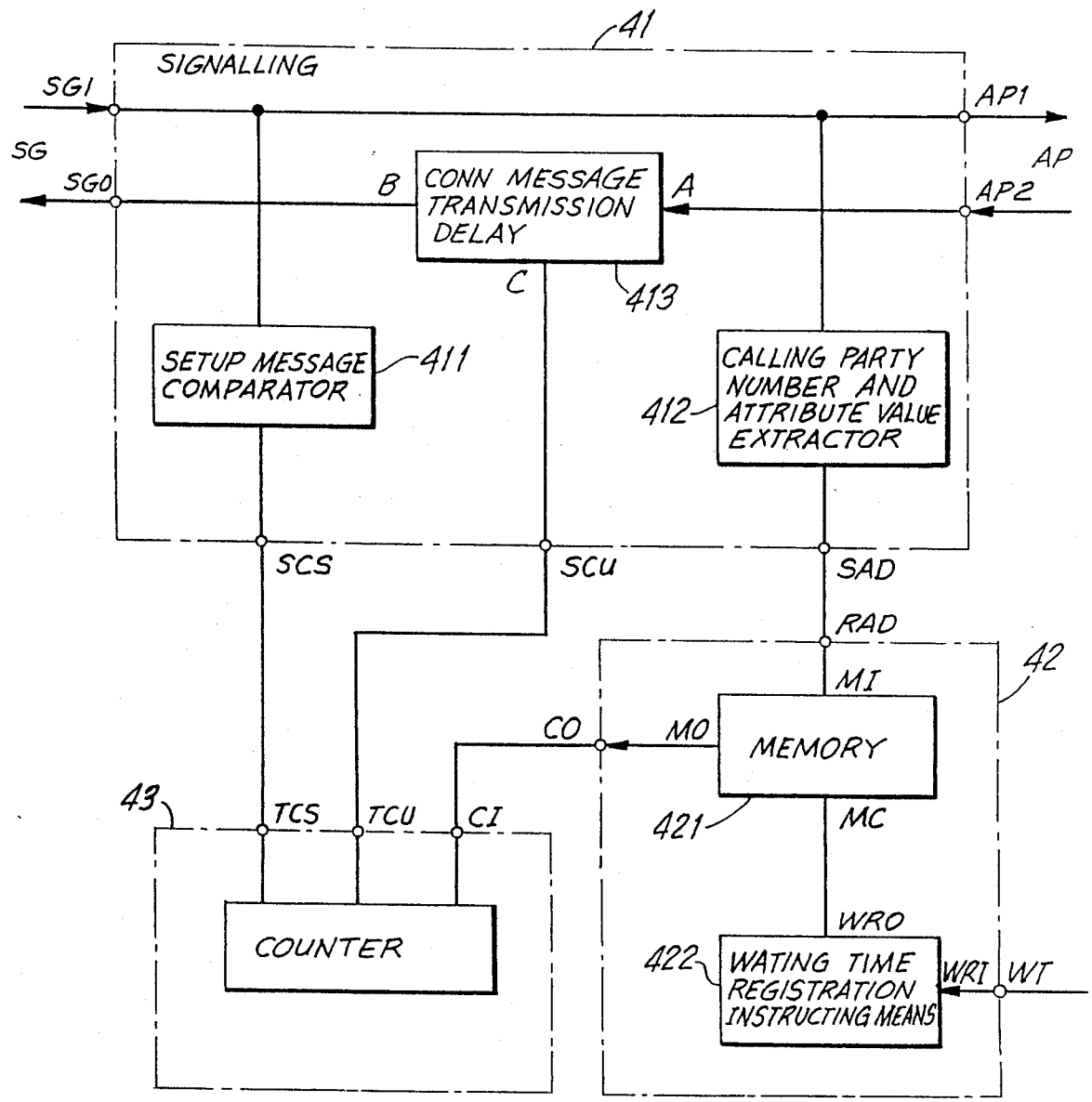
FIG. 4 is a block diagram illustrating the embodiment of the invention in detail.

As shown in FIG. 4, the annex response processing means 33 includes a signalling means 41, a priority order setting means 42, and a timer means 43. The signalling means 41 is connected to a signalling section of a digital access signalling system of a communication network via a signalling input/output terminal SG (SGI and SGO), while being connected to the user application 34 of the TE 30 via an application terminal AP (AP1 and AP2). Further, the signalling means 41 is connected to a count-up terminal TCU of the timer means 43 via a count-up terminal SCU. The timer means 43 is connected to a count start terminal SCS of the signalling means 41 via a count start terminal TCS, and to a control output terminal CO of the priority order setting means 42 through a control input terminal CI. The priority order setting means 42 is connected to the user application 34 (FIG. 3) via a waiting time input terminal WT, and to a call type information output terminal SAD of the signalling means 41 via a call time information input terminal RAD.

In detail, the signalling input terminal SGI of the signalling means 41 is connected to a SETUP message comparator (SMC) 411. The output of the SMC 411 is delivered via the count start terminal SCS. The input terminal SGI is also connected to a calling party number and attribute value extractor (CAE) 412. The output of the CAE 412 is delivered via the call type information output terminal SAD. On the other hand, the signalling input terminal SGI is connected to the application terminal AP1. The count-up terminal SCU is connected to an input terminal C of a CONN message transmission delay means (CMT) 413. The CMT 413 also has an input terminal A connecting to the application terminal AP2, and an output terminal B connecting to the signalling output terminal SGO.

The priority order setting means 42 includes a memory (MEM) 421, and a waiting time registration instructing means (WR) 422. The RAD is connected to an input terminal MI of the MEM 421 while the waiting time input terminal WT is connected to an input terminal WRI of the WR 422. The WR 422 has an output terminal WRO connecting to a control input terminal MC of the MEM 421. An output terminal MO of the MEM 421 is connected to the control output terminal CO of the register 42.

Next will be described the operation of the priority order control of incoming calls at ISDN terminals according to the present invention with reference to FIGS. 1 and 3 to 5. First referring to FIG. 4, at a point of time $t_0$, a incoming call acceptance (SETUP) message is sent from a switching system (not shown) of an ISDN network 10 to all terminal equipments (TE's) 23 to 2n connecting to a point-multipoint bus 22. Upon inputting of this SETUP message, the signalling means 41 checks the contents of this SETUP message and, at the same time, actuates the timer means 43. Each of the TE's 23 to 2n performs compatibility checking and, if it is a compatible call, the priority order setting means 42 in each of the TE's 23 to 2n instructs the timer means 43 of a preset period. The timer means, after having waited for that period, notifies the signalling means 41 of the termination of the period.

Meanwhile, for a call having been determined by compatibility checking to be incompatible with a given TE, the priority order setting means 42 gives no instruction to the timer means 43 as to timing, so that the signalling means 41 is never notified of period termination. The timer means 43 is reset after the elapse of a predetermined period of time after its actuation. When, the signalling means 41 of the TE's 23 and 25 to 2n, for instance, out of all the TE's have been notified of the termination of the period, they issue CONN messages to the network 10. Meanwhile, the TE 24 which is never notified by the timer means 43 of period termination issues no CONN message. Thus the TE's 23 and 25 to 2n send CONN messages to the unshown switching system of the network 10 at the times $t_1$, $t_2$ and $t_3$, respectively, set by the priority order setting means 42.

Then the switching system actually connects the call by returning a CONNect ACKnowledge (CONN ACK) message to the TE 23, corresponding to the first one, out of all the CONN messages sent from the TE's 23 and 25 to 2n, that has reached the switching system, and release all the other TE's by sending to them call DISConnect (DISC) messages.

The response of the TE 30 to an incoming call will be described in detail with reference to FIGS. 3, 4, 6 and 7. It is to be noted that the operation which will be described also applies to all the other terminal equipments.

Figure 6:
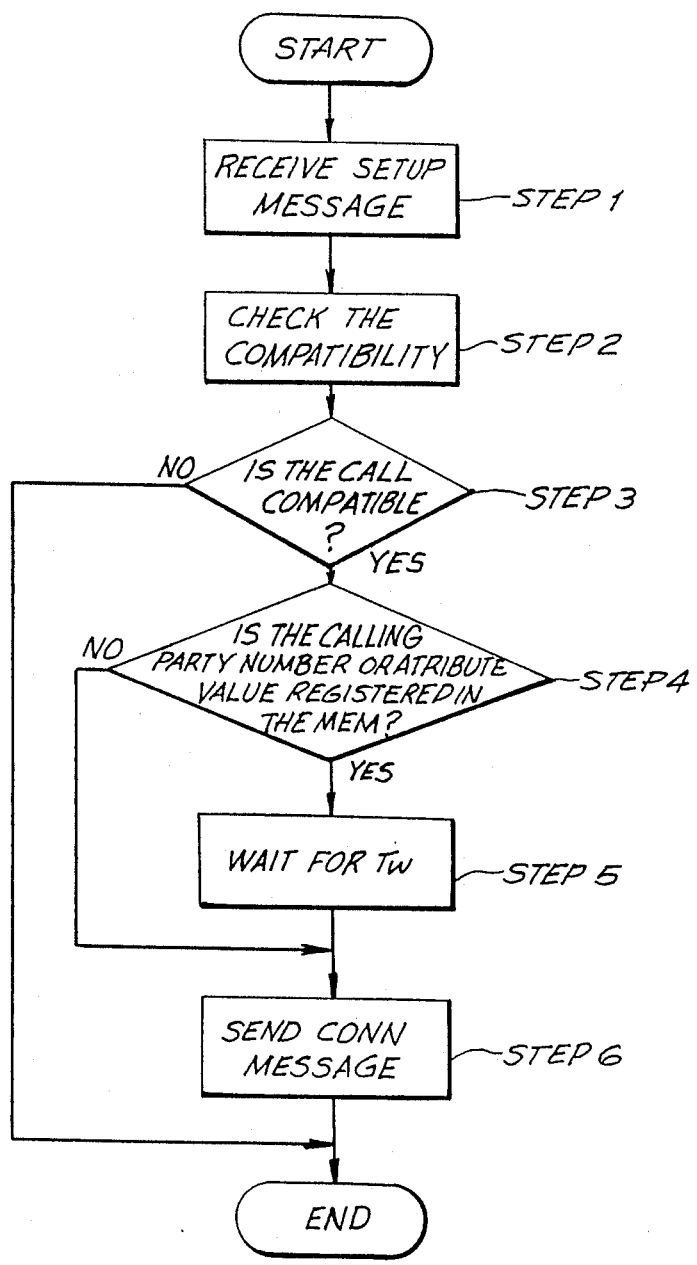
FIG. 6 is a flow chart illustrating the processing of an incoming call in the embodiment of the invention.

A SETUP message from a network is applied to the signalling means 41 via the signalling input terminal SGI. The contents of the message are reported to the user application 34 (FIG. 3) via the application terminal AP1. Simultaneously, when the SMC 411 of the signalling means 41 decides that the SETUP message has been received, the signalling means 41 delivers a count start command to the count start terminal TCS of the timer means 43 via the count start terminal SCS (FIG. 6, STEP 1). This is represented by a time A in FIG. 7, i.e. a SETUP message receipt time. The CAE 412 of the signalling means 41 extracts the calling party number and attribute values of the call from the SETUP message and, then, feeds them to the RAD of the priority order setting means 42 via the SAD.

Analyzing the contents of the SETUP message, the user application 34 performs compatibility checking, i.e. it compares "bearer capability" and, if necessary, "low layer compatibility", "high layer compatibility" and "user-user" information elements with those of the own terminal 30 (STEP 2). When it is decided that attributes of the call are compatible with those of the TE 30 (STEP 3), the user application 34 delivers a CONN message to the application terminal AP2.

Meanwhile, the MEM 421 of the priority order setting means 42 receives the inputting of the subscriber number of the calling party and the attribute values of the call in the incoming call message, extracted by the CAE 412, from the MI, and checks whether the subscriber number of the calling party or the attribute values are registered in this MEM 421 (STEP 4). Only when the checking has revealed registration of the information, a waiting-time setting signal corresponding to the subscriber number of the calling party or the attribute values, entered from the MC at the time of the registration and stored in the MEM 421, is supplied from the output terminal MO to the CI of the timer means 43 via the control output terminal CO.

Figures 7, 8:
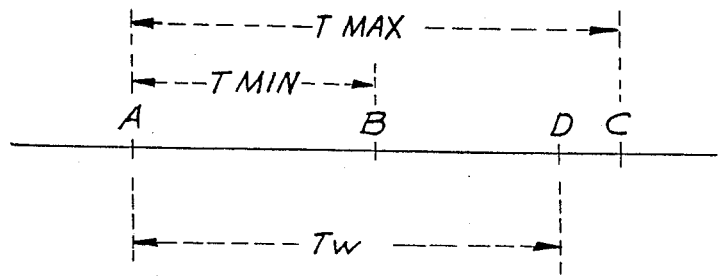
FIG. 7 is a response timing chart.
FIG. 8 illustrates an example of fields in a memory part of the register section.

The CMT 413 of the signalling means 41, when it receives at its terminal A from the terminal AP2 a response signal from the user application 34 of the TE 30, and at the input terminal C the count-up signal from the timer means 43 through the terminal SCU, returns a CONN message to the communication network from its output terminal B via the signalling output terminal SGO (STEP 6). A time B indicated in FIG. 7 is the earliest possible response time, and the period from the time A to the time B is the minimum response time $T_{MIN}$. The maximum response time determined by the network is represented by $T_{MAX}$.

Next it is supposed that the waiting time setting signal n is supplied from the MEM 421 of the priority order setting means 42 to the CI of the timer means 43. Since the timer means 43, as stated above, started counting upon arrival of the SETUP message, it compares the value n of the waiting time setting signal and its own count, and after waiting until the count becomes at least equal to the value n of the waiting time signal, i.e., from time D on, for instance, after the lapse of a waiting time Tw, referred to in FIG. 6, from the count start time A, outputs from the count-up terminal TCU a count-up signal to the SCU of the signalling means 41. The CMT 413 of this signalling means 41 returns a CONN message from its output terminal B to the communication network via the signalling output terminal SG when both a response instruction from the user application 34 in the TE 30 and a count-up signal from the timer means 43 have been inputted to the input terminals A and C, respectively (STEP 6).

Thus, when a call is to be received, each of the TE's 23 to 2n (FIG. 1) returns a CONN message after the lapse of the waiting time Tw registered in advance with its memory. If the waiting time Tw of each TE is preset a little different from those of other TE's, the network 10 will connect only the TE having first returned a CONN message, so that, out of the TE's having actually returned CONN messages, one with the least waiting time will answer the call.

Since a TE whose power supply is off or one currently in use will send no CONN message, neither will answer the call. Therefore, waiting time values Tw are assigned to the TE's in an ascending order in the descending order of their priorities, i.e. a TE lower in the order of priority is allocated a higher waiting time value Tw.

Now will be described how a waiting time value Tw is registered with the priority order setting means 42. First the order of priority is determined for the TE's 23 to 2n to be connected to the point-multipoint bus 22 according to the calling party's subscriber number and/or the attributes of the call.

Suppose, for instance, that the TE's 23, 24 and 25 all have both facsimile and packet communication terminal functions, and that the priority for accepting a facsimile call is assigned in the order of TE 23, TE 24 and TE 25, and that for serving as a packet communication terminal is in the reverse order. For the facsimile attribute, corresponding waiting time set values $n_{23}$, $n_{24}$ and $n_{25}$ are separately entered into the terminal, one value for each terminal, through the waiting time inputting terminal WT of the priority order setting means 42 through the user application 34 so that $TW_{23}$, $TW_{24}$ and $TW_{25}$, waiting time values respectively corresponding to the TE's 23, 24 and 25, be in an ascending order. Similarly for the packet communication attribute, the waiting time values are set in a descending order.

The same applies to the subscriber number of the calling party. If the order of priority, for instance of TE 24, TE 25 and TE 23, is to be set only with respect to a specific calling party, waiting time set values $n_{23}$, $n_{24}$ and $n_{25}$ are so registered with the priority order setting means 42, together with the subscriber number of this calling party, as to assign an ascending order to the three TE's.

A priority order for the combination of the calling party's subscriber number and one or another of the attributes is similarly registered with the priority order setting means 42.

FIG. 8 illustrates an example of contents of the MEM 421 of the priority order setting means 42. The MEM 421 has a plurality of pairs each of a field 4211 in which to write the calling party's subscriber number and/or attribute and a field 4212 in which to write the corresponding waiting time set value n. The waiting time registration instructing means (WR) 422 either adds or eliminates a pair of fields 4211 and 4212 or modifies the contents of a field 4212 according to control information supplied from the waiting time input terminal WT.

What is claimed is:

1. A method of controlling a priority order for an incoming call of an integrated service digital network (ISDN) to a plurality of ISDN terminals connected to an ISDN user network interface, said terminals having a common subscriber number telecommunication service attribute information and no subaddress, said network including a network termination which supplies a SETUP message containing a calling party number and a telecommunication service attribute information, the method comprising the steps of:
    (a) providing in each terminal a timer and starting the timer when the SETUP message of an incoming call of the ISDN is received in a terminal;
    (b) checking an ISDN compatibility to determine whether a terminal responds to the SETUP message by comparing the telecommunication service attribute information contained in the received SETUP message with the telecommunication service attribute information given to the terminal;
    (c) providing in each terminal a memory storing at least one of waiting time set values for establishing a desired priority order concerning the type of the telecommunication service attribute information;
    (d) determining whether the memory in said terminal stores the telecommunication service attribute information contained in the received SETUP message;
    (e) where the telecommunication service attribute information is stored in said memory, outputting a setting signal for one of the waiting time set values, which corresponds to the telecommunication service attribute information;
    (f) comparing a count of said timer with said waiting time set value and outputting a count-up signal when a timing operation of the timer has continued for at least said waiting time set value; and
    (g) upon detection of said count-up signal, responding to the network with an ISDN CONNECT message which indicates that the terminal is eligible to accept said incoming call, whereby a priority order for responding to the incoming call of the ISDN in the plurality of ISDN terminals is variable according to a telecommunication service attribute of the incoming call of the ISDN.

2. A method of controlling a priority order for an incoming call of an integrated service digital network (ISDN) to a plurality of ISDN terminals connected to an ISDN user network interface, said terminals having a common subscriber number telecommunication service attribute information and no subaddress, said network including a network termination which supplies a SETUP message containing a predetermined calling party number and telecommunication service attribute information said method comprising the steps of:
    (a) providing a timer in each terminal and starting a timer when the SETUP message of an incoming call of the ISDN is received in a terminal;
    (b) checking an ISDN compatibility to determine whether a terminal responds to the SETUP message by comparing the telecommunication service attribute information contained in the received SETUP message with the telecommunication service attribute information given to the terminal;
    (c) providing in each terminal a memory storing a waiting time set value for establishing a desired priority order concerning a predetermined calling party number;
    (d) determining whether the memory in the terminal stores the calling party number contained in the received SETUP message;
    (e) where the calling party number is stored in said memory, outputting a setting signal for the waiting time set value which corresponds to the calling party number;
    (f) comparing a count of said timer with said waiting time set value and outputting a count-up signal when a timing operation of the timer has continued for at least said waiting time set value; and
    (g) upon detection of said count-up signal, responding to the network with an ISDN CONNECT message which indicates that the terminal is eligible to accept said incoming call, whereby a priority order for responding to the ISDN incoming call in the plurality of ISDN terminals is variable according to the predetermined calling party number.

3. A circuit for controlling a priority order in which a terminal connected to an interface of an integrated service digital network (ISDN) answers a SETUP message indicating an incoming call of an ISDN, the circuit comprising:
    priority order setting means for establishing a desired priority order, the priority order setting means including a memory storing at least one of waiting time set values, each of the waiting time set values corresponding to a type of a telecommunication service attribute which is given to the terminal of the ISDN;
    timer means for timing an interval which begins when the SETUP message arrives at the network and which ends at one of the waiting time set values corresponding to the type of the telecommunication service attribute of an arrived SETUP message; and
    signalling processing means for sending an ISDN CONNECT message when said timer means has timed said interval and when the terminal has capabilities to accept the SETUP message.

4. The circuit of claim 3, wherein said priority order setting means is constructed so as to further store a waiting time set value corresponding to a calling party number to determine a priority order for responding to an incoming call of the ISDN from a predetermined calling party number.

* * * * *